March 7, 1961 K. GEBELE 2,973,700
PHOTOGRAPHIC CAMERA
Filed Dec. 27, 1955 3 Sheets-Sheet 1

INVENTOR
KURT GEBELE,
by John B. Brady
ATTORNEY

March 7, 1961 K. GEBELE 2,973,700
PHOTOGRAPHIC CAMERA
Filed Dec. 27, 1955 3 Sheets-Sheet 2

INVENTOR
KURT GEBELE,
by John B. Brady
ATTORNEY

March 7, 1961  K. GEBELE  2,973,700
PHOTOGRAPHIC CAMERA
Filed Dec. 27, 1955  3 Sheets-Sheet 3

INVENTOR
KURT GEBELE,
by
John B. Brady
ATTORNEY

United States Patent Office 2,973,700
Patented Mar. 7, 1961

2,973,700
PHOTOGRAPHIC CAMERA

Kurt Gebele, Munich, Germany, assignor, by mesne assignments, to Compur-Werk Friedrich Deckel OHG, Munich, Germany, a corporation of Germany Filed Dec. 27, 1955, Ser. No. 555,720

Claims priority, application Germany Dec. 28, 1954

8 Claims. (Cl. 95—44)

My invention relates broadly to cameras and more particularly to a construction and assembly of camera and corrective mechanism for the associated view finder.

My invention relates to that class of camera referred to in the applications of Walter Voss, for Photographic Camera, Serial Number 197,189, filed November 24, 1950, (now abandoned), and application Serial Number 419,286, filed March 29, 1954, for Photographic Camera with Range Finder, now abandoned, both assigned to Hans Deckel, of Munich-Solln, Germany, and Friedrich Wilhelm Deckel, of Zug, Switzerland.

Heretofore in the art of photographic cameras an adjustable corrective member for view finders has been proposed, which can be controlled by the interchangeable objective by means of a transmitting device. The corrective member may be used either for limiting the picture area or for parallactic compensation. But, in prior arrangements of this type the transmitting device is arranged outside the shutter which makes it rather complicated to handle and expensive in manufacture and production.

The object of the present invention is to provide a compact, simple and inexpensive form of transmitting device extending between the corrective member and the interchangeable objective.

This problem is solved according to my invention by extending a member of the transmitting device through the space of the instantaneous shutter.

According to another feature of my invention the member is constructed as a transmission pin, preferably parallel to the optical axis of the camera, which is either pivoted or axially adjustable.

Other features of my invention are described more fully in the specification hereinafter following by reference to the accompanying drawings, in which.

Figures 1, 2:
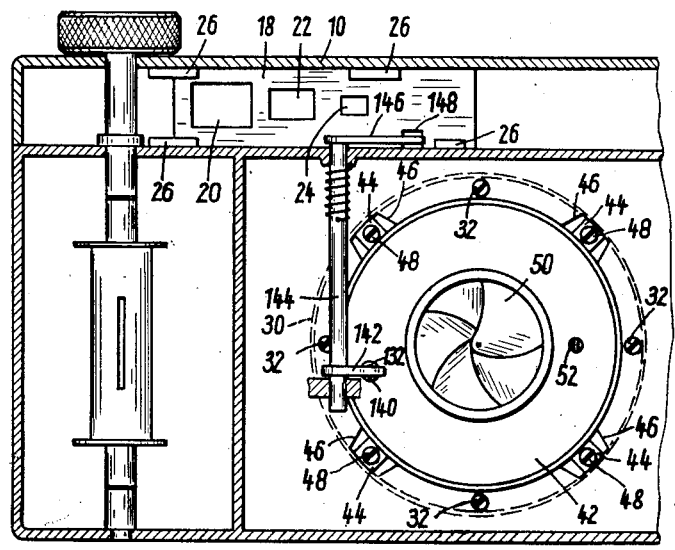
Fig. 1 is a longitudinal section of a fragmentary portion of a camera, showing one embodiment of my invention.
Fig. 2 is a fragmentary top view of the camera shown in Fig. 1, the view being broken away to illustrate the correcting mechanism.

The photographic camera represented in Figs. 1 and 2 has a body 10 of the ordinary form. In the upper part of the body 10 is arranged a view finder which consists of two lenses 12, 14 and of a diopter 16. The picture area of the view finder can be limited by a view finder mask 18 with three different mask openings 20, 22, 24. This view finder mask can have the form of a slide which is guided by a few guide lugs 26 of the camera body and which can be displaced transverse to the optical axis of the camera and of the view finder.

The adjustment of the necessary mask opening of the view finder mask 18, acting as a corrective member, in the path of rays of the view finder is effected according to the respective optical conditions at the camera, that is, corresponding to the interchangeable objective used in the respective case. The corrective member of the view finder is thus controlled by the interchangeable objective by means of a transmitting device which is so arranged according to the invention that a member thereof is conducted through the space of the instantaneous shutter. The arrangement of the instantaneous shutter at the camera can be seen in detail in Figs. 3 and 4.

Figure 4:
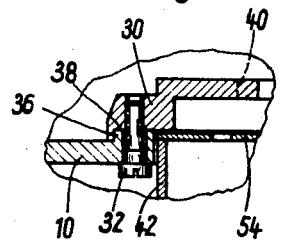
Fig. 4 is a detail view on an enlarged scale, showing one method of interconnecting the shutter casing with the wall of the camera.

A holding member in the form of a bayonet ring 30 is secured to the front wall of the camera 10 by means of circumferentially spaced screws 32. A cylindrical lug 36 (Fig. 4) of the camera engages a cylindrical depression 38 of the bayonet ring 30 and serves to center the latter with regard to the optical axis (Fig. 4). The bayonet slots of the bayonet ring 30 are designated at 40. The cylindrical shutter casing 42 of conventional form is provided at the circumference with several flange eyes 44, which pass through corresponding cutouts 46 at the front wall of the camera 10 and which engage the cylindrical depression 38 of the bayonet ring 30 with which they are rigidly connected by screws 48. Thus the shutter casing 42 is connected with the bayonet ring 30 and at the same time retained at the camera 10.

In the interior of the shutter casing 42 are arranged the shutter sectors 50 with their driving and control mechanisms of known design and method of operation. The operation of the shutter (setting and releasing) is effected from the camera by means (not represented) which are in engagement with the operating shaft 52 of the shutter protruding at the rear. The time of exposure is set at the shutter by means of the time setting ring 54, which is pivotally mounted on the front side of the shutter. The time setting ring 54, which is arranged inside the camera 10 and bayonet ring 30 is so connected with an outer setting ring 56, that this setting ring 56 is secured by screws 60 to a pot-shaped entrainer ring 58 and that an angularly disposed tongue 64 of the time setting ring 54 engages an opening 62 of this entrainer ring 58. The tongue 64 extends through an arc-shaped slot 66 of the bayonet ring 30. A shim ring 68 is rigidly connected with the bayonet ring 30 by screws 69 and secures the parts 56 and 58 in an axial direction.

The bayonet ring 30 also serves as a detachable mounting for an objective unit arranged in front of the shutter unit. This interchangeable objective unit has a mounting ring 70 with bayonet projections 71 which cooperate with the bayonet slots 40 of the bayonet ring 30.

The mounting ring 70 serves as a carrier of a tubular casing 72 in which are arranged the objective lenses and which can be displaced axially, that is, in the direction of the optical axis, to set the distance. The casing 72 thus represents the axially movable part of the interchangeable objective. The axial displacement of the lens tube 72 is effected by means of a threaded ring 74 which can be screwed on a threaded coupling 76 of the mounting ring 70. The front face 78 of the threaded ring 74 presses against a lug 80 of the lens tube 72. In order to be able to transmit to the lens tube 72 only the axial component of the spiral motion of the threaded ring 74, a radial pin 82 is provided in the lens tube 72, which passes through a slot 84 extending parallel to the axis of the threaded coupling 76 and which engages an annular groove 86 of the threaded ring 74.

The diaphragm of known design and operation, consisting of several diaphragm blades 88, is arranged in the hollow space 90 of the lens tube 72. The diaphragm setting member 92 has an angularly disposed arm 94 which is provided with an axial slot 96. This slot must be somewhat longer than the axial displacement range of the lens tube 72. This slot 96 is engaged by a radial entrainer tongue 98 of a coupling ring 100 which is axially guided on the cylindrical circumference 102 of the mounting ring 70. The coupling ring 100 is subjected to the action of several springs 104, which load it in an axial direction. The aperture 106 in the mounting ring 70, through which the entrainer tongue 98 of the coupling ring 100 extends, is designed as a circumferential slot so that the coupling ring 100 can also move in a radial direction with regard to the mounting ring 70 of the interchangeable objective. A handle 108 is secured (for example, riveted) in the coupling ring 100, as can be seen clearly from Fig. 3. The coupling claws 110, projecting toward the inside, engage coupling recesses 112 at the front side of the entrainer ring 58.

The arrangement of the adjusting scales at the shutter and the interchangeable objective can be seen best in Fig. 2. The bayonet ring 30 carries a stationary main mark 114, which cooperates with a time scale 116 on the entrainer ring 58 of the time setting ring 54. The diaphragm scale 118 is arranged on the circumference of the coupling ring 100, and also cooperates with the main mark 114. The relative setting of the coupling ring 100 is effected by means of a scale 120 with summary exposure values, which is arranged on the entrainer ring 58 and which cooperates with a mark 122 on the coupling ring 100. The distance scale 124 is carried by the threaded ring 74 and is set by means of the mark 126 of the lens tube 72.

In order to be able to effect the control of the corrective member, in this case, the view finder mask 18, by different interchangeable objectives, the axially immovable mounting ring 70 of each interchangeable objective is provided with a lug 128 with an annular stop face 130. The ring 70 is moved in axial direction only when the objective lens is attached to the camera, i.e. axially mounted in the bayonet slots 40 of the bayonet ring 30. Only while the interchangeable objective lens is attached to the camera, the hollow bushing 132b or the pin 132 is moved by the stop surface 130. The distance existing in the direction of the optical axis between the stop face 130 and the foremost face of the bayonet ring 30 varies in the different interchangeable objectives and this difference in the distance is used for the above mentioned control of the corrective member. On the stop face 130 of the respective interchangeable objective bears a pin 132 which extends parallel to the optical axis of the camera and which forms a member of the transmitting device between the interchangeable objective and the view finder-corrective member. This pin according to the invention extends through the space of the shutter so that the design of this device is compact, simple and inexpensive. The pin 132 is guided in a bore 134 of the bayonet ring 30 and passes through an arc-shaped slot 135 of this time-setting device, so as not to prevent a rotary motion of the time-setting ring 54 and passes through the interior of the shutter casing 42 and is again guided in a bore 138 at the rear wall of the shutter casing 42. The end 140 of the pin 132, protruding from the shutter casing 42, presses against a lever arm 142 of a pin 144 which is mounted in a spring-loaded manner on the interior of the camera. A second lever arm 146 at the other end of the pin 144 engages a slot 148 of the view finder mask 18.

When attaching the interchangeable objective, the pin 132 is axially displaced by the respective stop face 130, thus shifting the view finder mask 18 over the rotating parts 142 to 146 and putting a mask opening suitable for the interchangeable objective, in this case the opening 20, in front of the lens 14 to limit the picture area.

Figure 3:
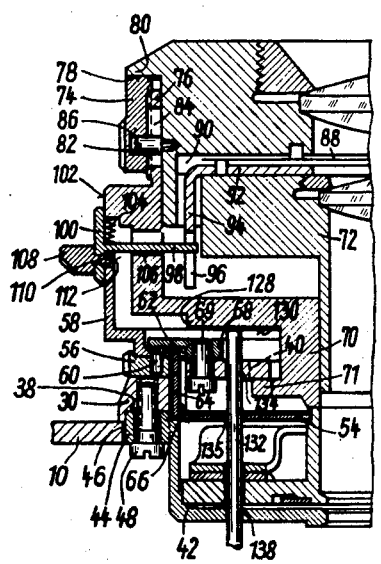
Fig. 3 is an enlarged fragmentary sectional view of a portion of the camera shown in Fig. 2.

Summarizing the disclosures of Figs. 1–4 the mounting ring of each interchangeable objective is provided with a lug 128 and with an annular stop face 130. One end of pin 132 engages said annular stop face 130 as shown in Fig. 3. The stop faces 130 of the various interchangeable objective lenses of different focal length are constructed in such a way that by mounting a new lens the pin 132 is pressed more or less into the camera housing 10, depending on the position of said face 130 on the objective lens used at the moment. The pin 132 passes through the space of the shutter casing while its other end controls the view finder mask 18 as shown in Fig. 2. It thus becomes possible to frame the picture area in accordance with the objective lens mounted on the camera.

Figure 5:
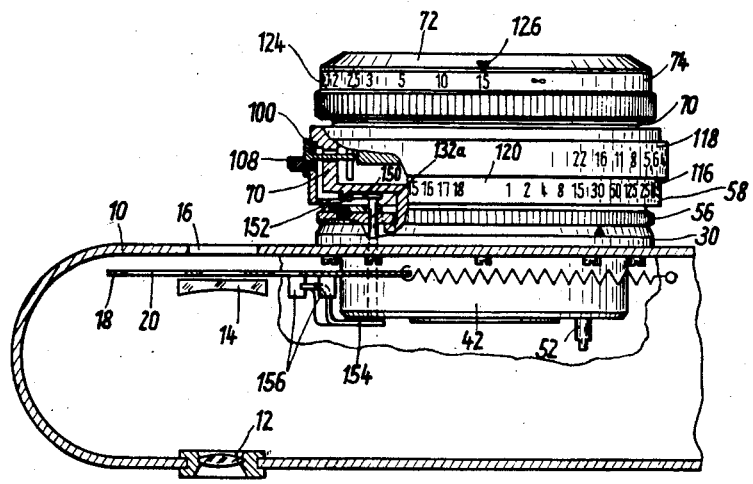
Fig. 5 is a fragmentary top view of a modified form of camera, embodying my invention, the view being broken away to illustrate the interior arrangement.

Fig. 5 shows a second embodiment of the subject of the invention. In this embodiment the shutter and the interchangeable objective are arranged in the same way as shown in Figs. 3 and 4. The pin 132a, used in this embodiment, is also extended in the manner hereinafter described for pin 132, through the space of the shutter. But, unlike the first embodiment, the pin 132a is not axially displaceable and can rotate only about its longitudinal axis, and this rotating motion controls the corrective member of the view finder. The pin 132a, has at one end a lever arm 150 which cooperates with a projection 152 of the interchangeable objective mounting ring 70, while its other end carries a lever arm 154 which engages between two lugs 156 of the view finder mask 18. The projection 152 is arranged in the individual interchangeable objectives in different angles with regard to the optical axis so that when the selected objective is attached the pin 132a is displaced by a larger or smaller angle of rotation and the view finder mask 18 is set correspondingly. According to Fig. 5 the view finder mask 18 is not controlled by means of displacement but by means of the rotation of pin 132a, which again depends on the interchangeable objective lens mounted on the camera.

Figure 6:
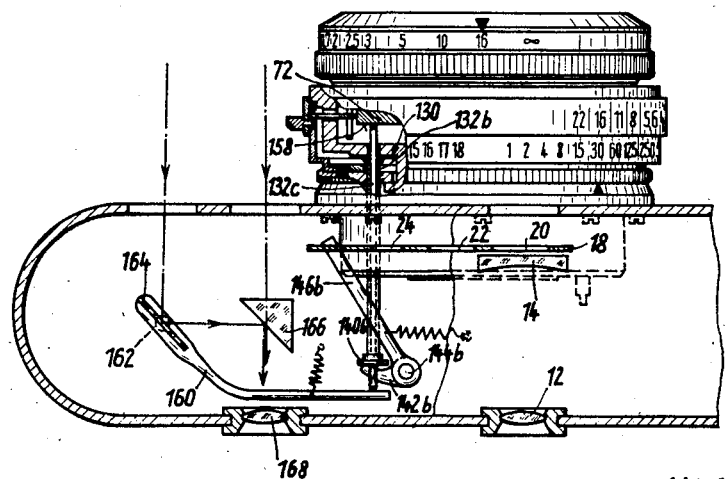
Fig. 6 is a fragmentary top view of a further modified form of camera of my invention, the view being broken away to show the interior.

In the third embodiment of my invention, according to Fig. 6, the member of the transmitting device passing through the space of the shutter casing is designed as a hollow bushing 132b which bears in the above described manner on the stop face 130 of the mounting ring 70 and whose end 140b controls the view finder mask 18 over the parts 142b to 146b. In the interior of the hollow bushing 132b, a pin 132c is axially displaceable; its one end presses against a lug or stop surface 158 of the lens tube 72, which is axially displaceable for setting the distance, while the other end of the pin 132c swings a lever 160 which is pivotally mounted at 162 and which carries a swivel mirror 164 of the range finder 166, 168. The axially immovable bushing 132b thus controls the corrective member 18 of the view finder when changing the objective, and the pin 132c, which is axially movable in setting the distance, controls the corrective member 164 of the range finder. Thus the view finder and the range finder are controlled by means of a coaxial arrangement of a pin and a sleeve.

Figure 7:
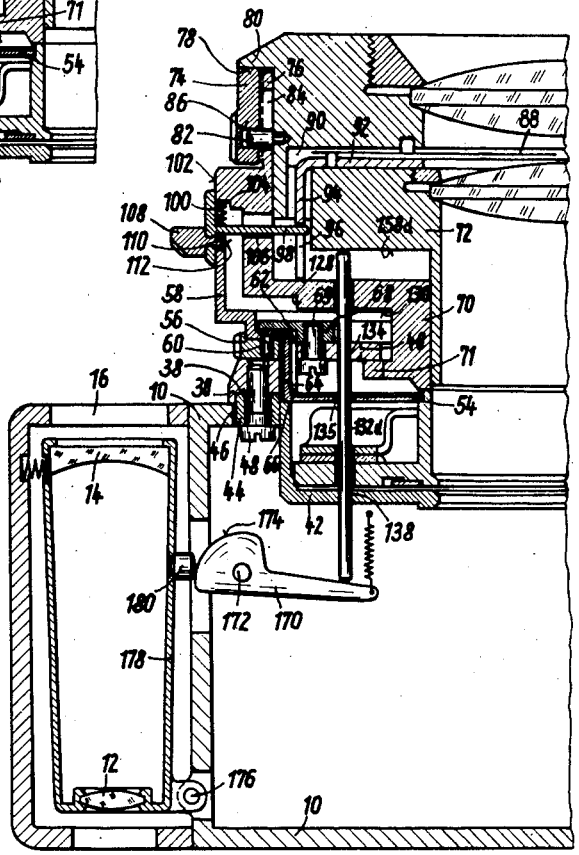
Fig. 7 is a fragmentary sectional view on an enlarged scale of a further modified form of my invention, the view showing one method of controlling the axis of the view finder.

The member which extends through the space of the shutter can also be used for controlling the parallaxis of the view finder, as it can be seen from the fourth embodiment of the invention shown in Fig. 7. In this embodiment the shutter and the interchangeable objective are also arranged in the same manner as indicated in Figs. 3 and 4. The corresponding parts have been designated with the same reference numbers. The pin 132d, which is moved axially by the lug 158d when the distance is set, now swings a corrective lever 170, which is pivotally mounted at 172 in the camera 10 and which carries a control cam 174. The view finder with lenses 12 and 14 is now arranged in a casing 178 that is pivoted at 176, and which is provided with a control pin 180 cooperating with the cam 174. When setting the distance, the pin 132*d* is axially displaced by the lug 158*d*, and the view finder is swung over the control parts, 174, 180, to compensate the parallaxis.

Finally I wish to mention that the subject of the invention is not confined to the hereinbefore embodiments. Other designs and combinations are also possible depending on the given operating conditions, but in all embodiments of my invention the member of the transmitting device is guided between the corrective member of the view finder and the interchangeable objective through the space of the shutter.

While I have described my invention in certain of its preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. A photographic camera comprising, a frame adapted to selectively mount any one of a number of differing adjustable interchangeable objectives, each objective being rotatable in said frame and having a stop surface, a view finder associated with said frame, a shutter and shutter housing aligned with said objective, said shutter housing being mounted in said frame, and a transmission pin supported in the shutter housing and extending therethrough parallel to the optical axis thereof, with one end of said pin in contact with the objective stop surface, said pin being axially displaceable with respect to said particular adjustable interchangeable objective mounted in said frame by rotation of said objective during attachment thereof to said frame for moving the stop surface thereon in contact with the end of said pin, for correspondingly controlling the position of said view finder for the particular interchangeable objective.

2. A photographic camera comprising, a frame adapted to selectively mount any one of a number of differing adjustable interchangeable objectives, each objective being rotatable in said frame and having a stop surface, a view finder associated with said frame, a range finder associated with said frame, a shutter and shutter housing aligned with said objective, said shutter housing being mounted in said frame, a transmission bushing supported in the shutter housing and extending therethrough parallel to the optical axis thereof, one end of said bushing in contact with the objective stop surface, said bushing being axially displaceable with respect to said particular adjustable interchangeable objective mounted in said frame by rotation of said objective during attachment thereof to said frame for moving the stop surface thereon in contact with the end of said bushing, for controlling the position of said view finder for the particular interchangeable objective, a transmission pin extending through said bushing and slidable and axially shiftable therein, and one end of said transmission pin being operatively connected to and axially shiftable with the adjustment of the range of each adjustable interchangeable objective for controlling the operation of said range finder.

3. A photographic camera as set forth in claim 2, in which said transmission pin extends through said stop surface.

4. A photographic camera as set forth in claim 1 in which said view finder is pivotally mounted on said frame and movable in a lateral plane to any one of a multiplicity of positions corresponding to the characteristics of the particular adjustable interchangeable objective mounted in said frame.

5. A photographic camera as set forth in claim 1 in which said view finder is pivotally mounted in said frame and is provided at one side with an abutment means, and at the other side with spring means tending to urge said view finder in the direction of said abutment means, a lever member pivotally mounted in said frame and having a cam surface on one end establishing sliding contact with the abutment means on said view finder, and a projecting arm on the other end, said projecting arm establishing contact with said transmission pin, whereby movement may be imparted to said cam surface for shifting said view finder to positions corresponding to positions to which said adjustable objective is moved.

6. A photographic camera comprising a frame adapted to selectively mount any one of a number of differing adjustable interchangeable objectives, each objective having a stop surface, a view finder pivotally mounted on said frame for movement in a lateral plane, a shutter and shutter housing aligned with the particular objective mounted in said frame, said shutter housing being mounted in said frame, means including a linearly displaceable transmission pin extending through said shutter housing, said stop surface on the particular adjustable objective mounted in said frame establishing contact with one end of said transmission pin for displacing said pin in an axial direction parallel to the optical axis of said shutter, a lever member pivotally mounted on said frame on an axis normal to the axis of said pin, one end of said lever member establishing sliding abutment with the other end of said transmission pin and the opposite end of said lever member establishing sliding abutment with said view finder whereby said view finder is adjustable in said lateral plane according to the movement of said objective.

7. A photographic camera comprising a frame adapted te selectively mount any one of a number of differing adjustable interchangeable objectives, each objective being rotatable in said frame and having stop surface means, a range finder mounted on said frame, a view finder associated with said frame, a shutter and shutter housing aligned with said objective, said shutter housing being mounted in said frame, a linearly displaceable transmission pin extending through said shutter, a linearly displaceable transmission bushing surounding said transmission pin supported in and extending through said shutter housing, said transmission pin and transmission bushing extending parallel to the optical axis of said shutter housing, one of said stop surface means on the adjustable objective mounted in said frame establishing contact with one end of said transmission pin for displacing said pin, the other end of said transmission pin contacting said range finder for adjusting the position of said range finder according to the adjustment of the particular adjustable interchangeable objective mounted in said frame, the other of said stop surface means on the particular adjustable objective mounted in said frame establishing contact with one end of said transmission bushing by rotation of said objective during attachment thereof to said frame for displacing said bushing, and means interposed between the other end of said transmission bushing and said view finder for correspondingly controlling the movement of said view finder according to the position of the particular adjustable interchangeable objective mounted in said frame.

8. A photographic camera comprising a frame adapted to selectively mount any one of a number of differing adjustable interchangeable objectives, each objective having a stop surface, finder means pivotally mounted on said frame for movement in a lateral plane, a shutter and shutter housing aligned with the particular objective mounted in said frame, said shutter housing being mounted in said frame, means including a linearly displaceable transmission pin extending through said shutter housing, said stop surface on the particular adjustable objective mounted in said frame establishing contact with one end of said transmission pin for displacing said pin in an axial direction parallel to the optical axis of said shutter, a lever member operatively connected with said finder means to turn said finder means upon its pivot, and the end of said lever member remote from the finder means slidably engaging the other end of said transmission pin to be actuated according to the movement of said objective.

References Cited in the file of this patent

UNITED STATES PATENTS

| | | |
|---|---|---|
| 2,187,246 | Nerwin | Jan. 16, 1940 |
| 2,191,281 | Leitz et al. | Feb. 20, 1940 |
| 2,364,413 | Wittel | Dec. 5, 1944 |
| 2,737,844 | Jerome et al. | Mar. 13, 1956 |

FOREIGN PATENTS

| | | |
|---|---|---|
| 676,075 | Great Britain | July 23, 1952 |